United States Patent [19]
Pinault

[11] Patent Number: 6,084,950
[45] Date of Patent: Jul. 4, 2000

[54] AUDIO COMMUNICATIONS DEVICE ADAPTER

[75] Inventor: Michael Charles Pinault, Hudson, N.H.

[73] Assignee: Davox Corporation, Westford, Mass.

[21] Appl. No.: 09/245,831

[22] Filed: Feb. 5, 1999

[51] Int. Cl.[7] .................................................. H04M 11/00
[52] U.S. Cl. .................... 379/93.06; 379/442; 379/93.05
[58] Field of Search .............................. 379/90.01, 93.01, 379/93.05–93.08, 93.21, 93.37, 110.01, 441–444

[56] References Cited

U.S. PATENT DOCUMENTS

5,533,105  7/1996  Brown et al. ......................... 379/93.05

*Primary Examiner*—Wing F. Chan
*Attorney, Agent, or Firm*—Bourque & Associates, P.A.

[57] ABSTRACT

An audio communications device adapter connects a plurality of audio communications devices, such as headsets, to digital data paths, such as T1 or E1 data paths in a telephony system. The adapter comprises one or more analog audio signal connectors that connect to analog audio signal paths coupled to the audio communications devices for receiving and transmitting outgoing and incoming analog audio signals. The adapter also includes a digital data connector for connecting to digital data paths to transmit and receive outgoing and incoming digital data streams containing digital encoded audio signal data. A digital data formatter coupled to the digital data connector extracts the incoming digital encoded audio signal data from the incoming digital data stream and formats the outgoing digital encoded audio signal data. The digital data formatter includes a T1 framer and interface, serial PROMs for programming the T1 framer and interface, timing and control circuits, and a T1 transmit equalizer. An audio signal converter coupled to the analog audio signal connector and to the digital data formatter converts the outgoing analog audio signals into the outgoing digital encoded audio signal data and converts the incoming digital encoded audio signal data into the incoming analog audio signals. The audio signal converter includes a plurality of codec circuits.

24 Claims, 7 Drawing Sheets

AUDIO COMMUNICATIONS DEVICE ADAPTER

FIELD OF THE INVENTION

The present invention relates to adapters for use with audio communications devices and in particular, to an audio communications device adapter for connecting a plurality of audio communications devices, such as headsets, to digital data paths, such as T1 or E1 paths in a telephony system.

BACKGROUND OF THE INVENTION

The use of digital data paths, such as T1/E1 data paths, have become common in telephony systems as an effective means to transmit and receive voice or other audio signals. In a typical telephony system, voice or audio signals are digitally encoded and formatted for transmission over the digital data path. A typical digital data transmission provides multiple channels for carrying streams of digital encoded audio signals. A standard T1 transmission, for example, provides 24 voice channels, each digitized at 64,000 bps, combined into a single 1.5 Mbps digital stream (8,000 bps signaling), and carried over two pairs of regular copper telephone wires.

One type of telephony system that utilizes digital data paths is a computerized call center having multiple agents or operators for handling inbound and outbound telephone calls. One example of call center includes multiple headsets connected to a digital communications server (DCS) that receives, processes and transmits digital encoded audio signals over T1/E1 date paths. The headsets have microphones and earphones to allow operators or agents to receive and transmit audio signals via the DCS. Expansion of an existing call center of this type is limited, however, because a limited number of headsets can be installed on a single DCS.

Operator interface cards in the DCS allow the use of headsets but also limit the connection distance from the DCS and significantly decrease the system capacity. Channel banks and Private Automatic Branch Exchanges (PABX's) can also be used to expand a telephony system, but they are very complicated to set up and expensive to buy. Channel banks and PABX's also require additional use of telephones at the agent workstations. The additional telephones are an additional expense, take up workspace, and add another level of complexity to the system installation.

Accordingly, a need exists for an adapter for connecting additional headsets or other audio communications devices to a digital data path in a telephony system. A need also exists for an audio communications device adapter that allows additional headsets or audio communications devices to be easily and cost effectively connected to a digital data path, such as a T1/E1 data path, without requiring unnecessary equipment.

SUMMARY OF THE INVENTION

The present invention features an audio communications device adapter for connecting a plurality of audio communications devices to digital data paths in a telephony system. According to the preferred embodiment, the digital data paths include T1/E1 data paths in a telephony system and the audio communications devices include headsets having a microphone and an earphone.

The audio communications device adapter comprises at least one analog audio signal connector, for connecting to a plurality of microphone analog audio signal paths that receive outgoing analog audio signals from respective microphones, and for connecting to a plurality of earphone analog audio signal paths that transmit incoming analog audio signals to respective earphones. The audio communications device adapter also comprises at least one digital data connector, for connecting to at least one transmitting digital data path to transmit an outgoing digital data stream containing outgoing digital encoded audio signals, and for connecting to at least one receiving digital data path to receive an incoming digital data stream containing incoming digital encoded audio signals. The adapter further comprises a digital data formatter, coupled to the digital data connector for extracting incoming digital encoded audio signal data from the incoming digital data stream, and for formatting outgoing digital encoded audio signal data into the outgoing digital data stream. The adapter further comprises an audio signal converter, coupled to the analog audio signal connector and to the digital data formatter, for converting the outgoing analog audio signals into the outgoing digital encoded audio signal data to be formatted by the digital data formatter, and for converting the incoming digital encoded audio signal data into the incoming analog audio signals to be transmitted to the earphone analog audio signal paths.

The analog audio signal connector includes a plurality of microphone analog audio signal connections, for connecting to the plurality of microphone analog audio signal paths, and a plurality of earphone analog audio signal connections, for connecting to the plurality of earphone analog audio signal paths. The digital data connector includes at least one receiving digital data connection, for connecting to the receiving digital da-:a path, and at least one transmitting digital data connection, for connecting to the transmitting digital data path.

The digital data formatter preferably includes a digital data framer and interface, coupled to the receiving digital data connection and to the audio signal converter. The digital data framer and interface extracts frames of incoming digital encoded audio signal data from the incoming digital data stream and frames outgoing digital encoded audio signal data into the outgoing digital data stream. The formatter also includes timing and control circuits, coupled to the audio signal converter and to the digital data framer and interface, for timing and controlling transmission of the digital encoded audio signal data between the digital data framer and interface and the audio signal converter. The digital data framer and interface further includes a digital data transmit equalizer, coupled to the digital data framer and interface and to the transmitting digital data connection, for equalizing the outgoing digital data stream containing the outgoing digital encoded audio signal data.

The digital data formatter further includes at least one programmable memory, coupled to the digital data framer and interface, for programming the digital data framer and interface.

The digital data formatter further includes a plurality of line length equalizer switches, coupled to the digital data transmit equalizer, for equalizing the outgoing digital encoded audio signal data based upon a length of the transmitting digital data path. The digital data formatter further includes an operation mode switch, coupled to the digital data framer and interface and to the analog signal converter, for switching between a normal operation mode and a free-run operation mode used for testing.

The audio signal converter preferably includes a plurality of codec circuits, coupled to respective microphone analog audio signal connections, for encoding the outgoing analog audio signals into the outgoing digital encoded audio signal data, and for decoding the incoming digital encoded audio signal data into the incoming analog audio signals. The audio signal converter further includes a plurality of amplifier circuits coupled to respective codec circuits for amplifying the incoming analog audio signals decoded by the codec circuits.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
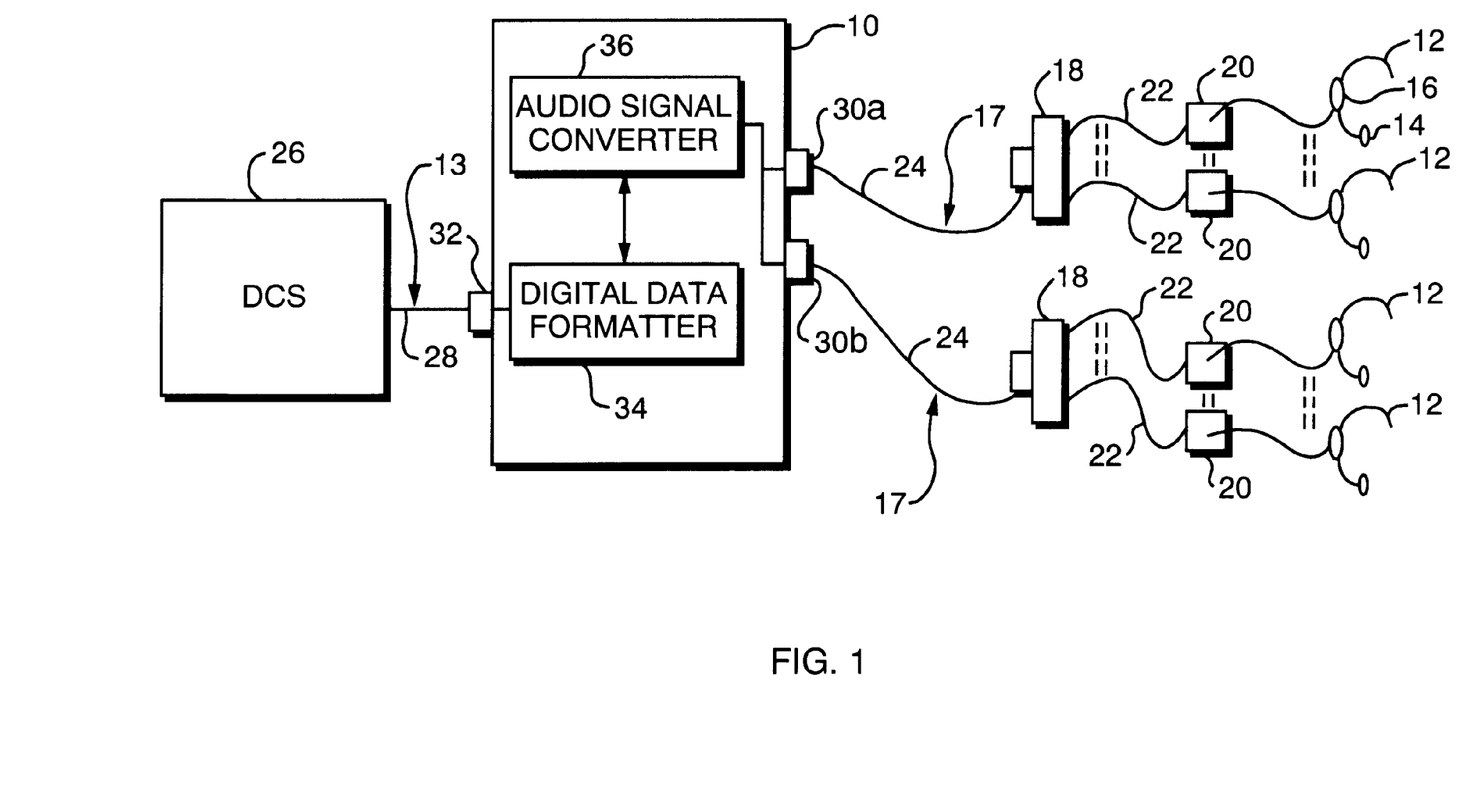
FIG. 1 is a schematic block diagram of an audio communications device adapter connecting a plurality of audio communications devices to a digital communications server (DCS), according to one embodiment of the present invention.

An audio communications device adapter 10, FIG. 1, according to the present invention, is used to connect a plurality of audio communications devices 12, such as headsets, to one or more digital data paths 13 in a telephony system. Each of the audio communications devices 12 includes a microphone 14 and an earphone 16 and are used by operators or agents to converse with parties connected to the telephony system. The microphone 14 and earphone 16 transmit and receive analog audio signals from the adapter 10 by way of one or more analog signal paths 17. The audio communications device adapter 10 converts the analog audio signals from analog signal paths 17 into a digital data and formats the digital data for transmission over the digital data paths 13, and vice versa, as will be described in greater detail below.

According to the exemplary embodiment, analog signal paths 17 are established by connecting multiple audio communications devices 12 to bunch blocks 18 using modular jacks 20 and two pair cables 22. Each of the bunch blocks 18 are connected to the audio communications device adapter 10 using a 25 pair cable 24. One example of the audio communications devices 12 includes standard type 2500 telephone headsets. The present invention contemplates other types of audio communications devices as well as other arrangements for connecting the audio communications devices to the adapter 10 using various types of connectors, cables, wireless connections, and other ways of establishing the analog signal paths 17.

In one application, the audio communications device adapter 10 is used in a telephony system having a digital communications server (DCS) 26, such as the type provided by Davox Corporation of Westford, Mass. and disclosed in greater detail in U.S. Pat. Nos. 5,592,543 and 5,604,740, assigned to Davox Corporation and incorporated herein by reference. In the exemplary embodiment, the DCS 26 processes and routes digital encoded audio signals using a T1 digital data format and is coupled to the audio communications device adapter 10 using a two pair T1 cable 28 to establish the digital data paths 13. In this application, the audio communications device adapter 10 expands the telephony system by increasing the total number of headsets that can be installed on a single DCS 26 to 120 headsets. The audio communications device adapter 10 is preferably a portable unit and in the exemplary embodiment, can be placed up to 655 feet away from the DCS 26.

The present invention contemplates using the adapter 10 in other types of telephony systems and with other types of digital data formats or protocols, such as E1 digital data. The present invention further contemplates other types of cables or ways of providing the digital data path 13 between the DCS 26 and the adapter 10.

The audio communications device adapter 10 includes one or more analog audio signal connectors 30a, 30b for connecting to analog signal paths 17, such as the cables 24, that carry the analog audio signals to the audio communications devices 12. In one example, the analog audio signal connector 30 includes a twenty-five pair Amphenol connector used for headset connections. The audio communications device adapter 10 also includes at least one digital data connector 32 for connecting to the digital data paths 13, such as digital data cable 28, that carry the digital encoded audio signals to the DCS 26. One example of the digital data connector 32 is a T1 fifteen pin sub D connector.

The audio communications device adapter 10 further includes a digital data formatter 34 coupled to the digital data connector 32. The digital data formatter 34 extracts incoming digital encoded audio signal data from an incoming digital data stream received over the digital data path 13. The digital data formatter 34 also formats the outgoing digital encoded audio signal data into an outgoing digital data stream to be transmitted over the digital data path 13.

The audio communications device adapter 10 further includes an audio signal converter 36 coupled to the analog audio signal connectors 30a, 30b and to the digital data formatter 34. The audio signal converter 36 converts the outgoing analog audio signals received from the analog audio signal paths 17 into the outgoing digital encoded audio signal data to be formatted by the digital data formatter 34. The audio signal converter 36 also converts the incoming digital encoded audio signal data extracted by the digital data formatter 34 into incoming analog audio signals to be transmitted over the analog audio signal paths 17.

Figure 2:
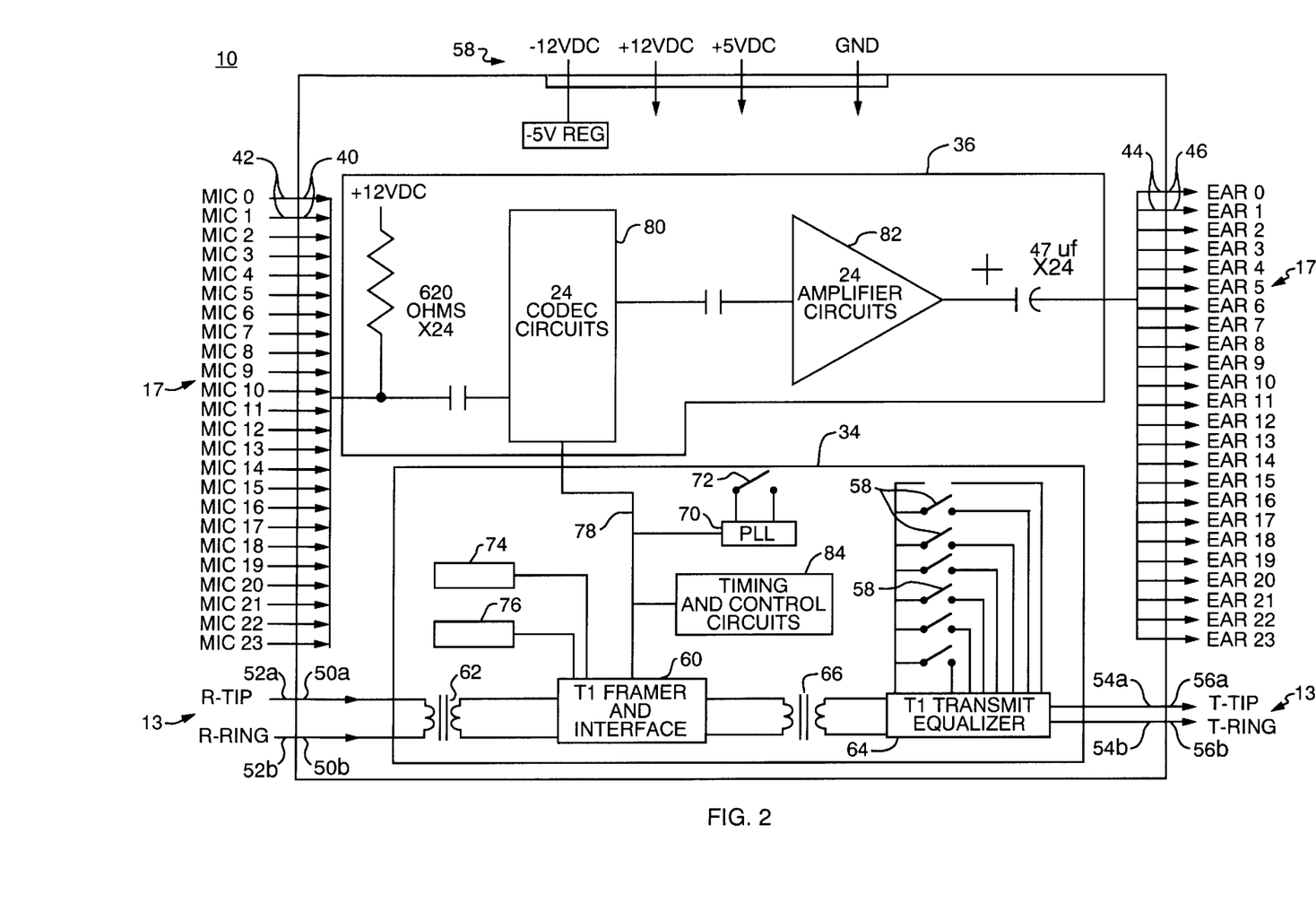
FIG. 2 is a schematic block diagram of the audio communications device adapter, according one embodiment of the present invention.

According to the exemplary preferred embodiment of the audio communications device adapter 10, FIG. 2, each analog audio signal connector 30 includes a plurality of microphone analog audio signal connections 40 that connect to a plurality of microphone analog audio signal paths 42. Each analog studio signal connector 30 also includes a plurality of earphone analog audio signal connections 44 that connect to a plurality of earphone analog audio signal paths 46. According to the exemplary embodiment described above, the microphone and earphone analog audio signal paths 42, 46 are located within each analog audio cable 24. The microphone analog audio signal paths 42 electrically connect to the microphones 14 in respective audio communications devices 12, and the earphone analog audio signal paths 46 electrically connect to the earphones in the respective audio Communications devices 12.

The digital data connector 32 preferably includes a pair receiving digital data connections 50a, 50b for connecting to a pair of receiving digital data paths 50a, 52b, such as receiving tip and ring lines in the digital data cable 28. The digital data connector 32 also preferably includes a pair of transmitting digital data connections 54a, 54b for connecting to a pair of transmitting digital data paths 56a, 56b, such as transmitting tip and ring lines in the digital data cable 28. The audio communications device adapter 10 further includes a power supply connector 58, for connecting to a power supply.

According to the exemplary embodiment, each analog audio signal connector 30 includes twenty-four microphone analog audio signal connections and twenty-four earphone analog audio signal connections for connecting to twelve headsets or audio communications devices 12. Thus, in the exemplary embodiment using a T1 digital data path, each headset or audio communications device 12 can be assigned to one of the twenty-four T1 channels.

In the exemplary embodiment, the digital data formatter 34 includes a T1 framer and interface 60 for extracting frames of incoming digital encoded audio signal data from the incoming digital data stream received by the receiving digital data connections 50a, 50b. The T1 framer and interface 60 also frames outgoing digital encoded audio signal data converted by the audio signal converter 36, thereby formatting the outgoing digital data stream to be transmitted by way of the transmitting digital data connections 54a, 54b. The framing format for the digital data stream includes any framing format used with a T1 transmission. A transformer 62 is preferably coupled between the T1 framer and interface 60 and the receiving digital data connections 50a, 50b for isolating the T1 framer and interface 60 from voltage potentials which could damage the T1 framer and interface 60. One example of the T1 framer and interface 60 is a MH89760B available from MITEL.

The digital data formatter 60 further includes a T1 transmit equalizer 64, for equalizing the outgoing digital data stream containing the outgoing digital encoded audio signal data framed by the T1 framer and interface 60. A transformer 66 is also coupled between the T1 framer and interface 60 and the T1 transmit equalizer 62. One or more T1 line length equalizer switches 68 are connected to the T1 transmit equalizer 64 for providing different T1 cable length equalization settings determined by the length of the T1 cable 28 connecting the adapter 10 to the DCS 26. One example of the T1 transmit equalizer 64 is a MH89761 available from MITEL. A PLL 70 and operation mode switch 72 are preferably coupled to the T1 framer and interface 60. The PLL 70 is used to synchronize the transmit signal of the T1 framer and interface 60 to the receive signal of the DCS 26. The mode operation switch 72 preferably switches between a testing mode and a normal operation mode.

The preferred embodiment of the digital data formatter 34 further includes one or more programmable memories 74, such as serial one-time programmable PROMs. These serial PROMs 74, 76 are used to program the T1 framer and interface 60 and eliminate the necessity for a microprocessor. The serial PROMs 74, 76 have internal address counters and reset logic aid are synchronized to the ST-BUS frame and clock signals. When a frame pulse is received by the T1 framer and interface 60, the internal address counter in the serial PROMs 74, 76 is reset to zero and automatically incremented with each clock.

One of the PROMs 74 is used to program a first control ST-BUS input on the T1 framer and interface 60. According to one example, the first serial PROM 74 is programmed such that addresses 0 through 14 and addresses 16 through 30 contain 04 hex data to program the T1 framer and interface 60 for non-inverted data and no loop-back for each of the twenty-four T1 channels. Address 15 data contains a hex value 42 to set the T1 framer and interface 60 to use alternate mark inversion (AMI), no zero code suppression, and no robbed bit signaling. Address 31 data contains a hex value zero to set up the T1 framer and interface 60 for no digital loop-back, no remote loop-back, D3/D4 mode, no maintenance, and not generating an all 1's alarm.

The second serial PROM 76 is connected to a second control ST-BUS input to control the A/B bits transmitted by the T1 framer and interface 60. According to one example, the second serial PROM 76 is programmed such that all 32 address locations contain a 0 hex value. The present invention contemplates various other programming parameters for the serial PROMs 74, 76, as described in the Mitel technical manual for the MH89760 T1 framer.

According to the exemplary embodiment, the audio signal converter 36 includes a plurality of codec circuits 80 corresponding to the respective analog audio signal connections 40, 44. In the exemplary embodiment, the audio communications device adapter 10 includes 24 codec circuits corresponding to 24 analog audio signal connections 40, 44 and 24 T1 channels. Each of the codec circuits 80 is coupled to the T1 framer and interface 60 by data paths 78 to transmit and receive the digital encoded audio signal data. The codec circuits 80 digitally encode the outgoing analog audio signals received from the respective microphone analog audio signal connections 40 into outgoing digital encoded audio signal data to be transmitted to the T1 framer and interface 60 for formatting. The codec circuits 80 also decode the incoming digital encoded audio signal data extracted by the T1 framer and interface 60 into incoming analog audio signals to be transmitted to the respective earphone analog audio signal connections 44. The codec circuits 80 preferably support both $\mu$-law and A-law compression.

In one example, the codec circuits 80 include devices from the National Semiconductor TP3054, TP3057 family of $\mu$-law and A-law monolithic PCM CODEC/filters utilizing the A/D and D/A conversion architecture and a serial PCM interface. The encode portion of each device consists of an input gain adjust amplifier, an active RC pre-filter which eliminates very high frequency noise prior to entering a switched-capacitator b)and-pass filter that rejects signals below 200 Hz and above 3400 Hz. Also included are auto-zero circuitry and a companding coder which samples the filtered signal and encodes it in the companied $\mu$-law or A-law PCM format. The decode portion of each device consists of an expanding decoder, which reconstructs the analog signal from the companded $\mu$-law or A-law code, a low-pass filter which corrects for the sin x/x response of the decoder output and rejects signals above the 3400 Hz followed by a single-ended power amplifier capable of driving low impedance loads. The devices require two 1.536 MHz, 1.544 MHz or 2.048 MHz transmit and receive master clocks, which may be asynchronous; transmit and receive bit clocks, which may vary from 64 kHz to 2.048 MHz; and transmit and receive frame sync pulses. The timing of the frame sync pulses and PCM data is compatible with both industry standard formats.

An amplifier circuit 82 is preferably coupled between each of the codec circuits 80 and the respective earphone analog audio signal connections 44, for amplifying the incoming analog audio signals decoded by the codec circuits 80.

Timing and control circuits 84 are coupled to the T1 framer and interface 60 and to the codec circuits 80. The timing and control circuits 84 provide timing and control of the transmission of the digital encoded audio signal data transmitted between the T1 framer and interface 60 and the codec circuits 80. The timing and control circuits 84 are used to synchronize the digital data to and from the 24 codecs 80 with the PCM highways connected to the T1 framer 60. Each codec 80 has an associated transmit and receive channel on the PCM highways. The timing and control circuits 84 generate the signals to each codec 80 at the appropriate time for data transfer to occur between the codec 80 and the T1 framer 60.

Figure 3A:
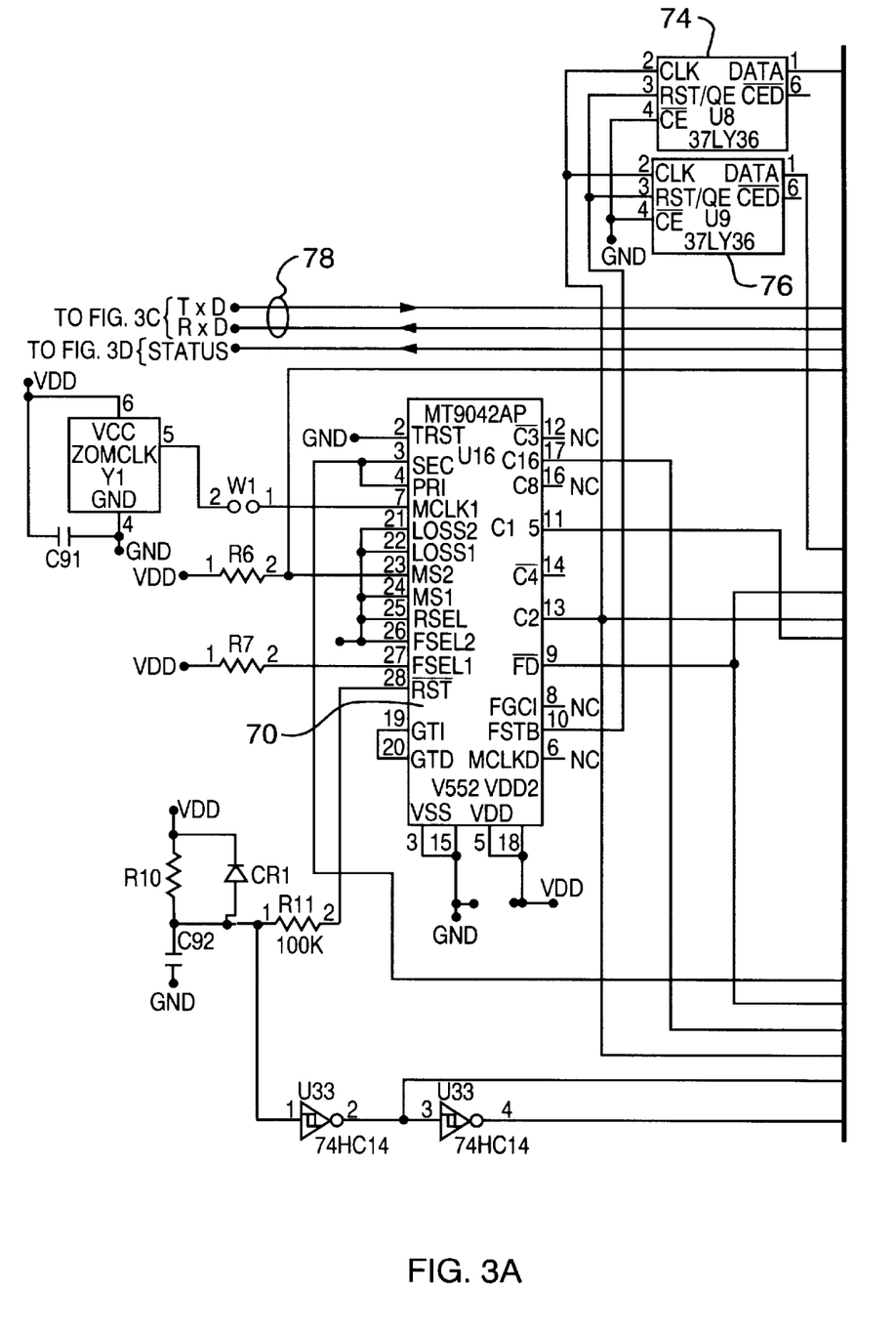
FIGS. 3A–3E are circuit diagrams of the audio communications device adapter, according to one embodiment of the present invention.
Figure 3B:
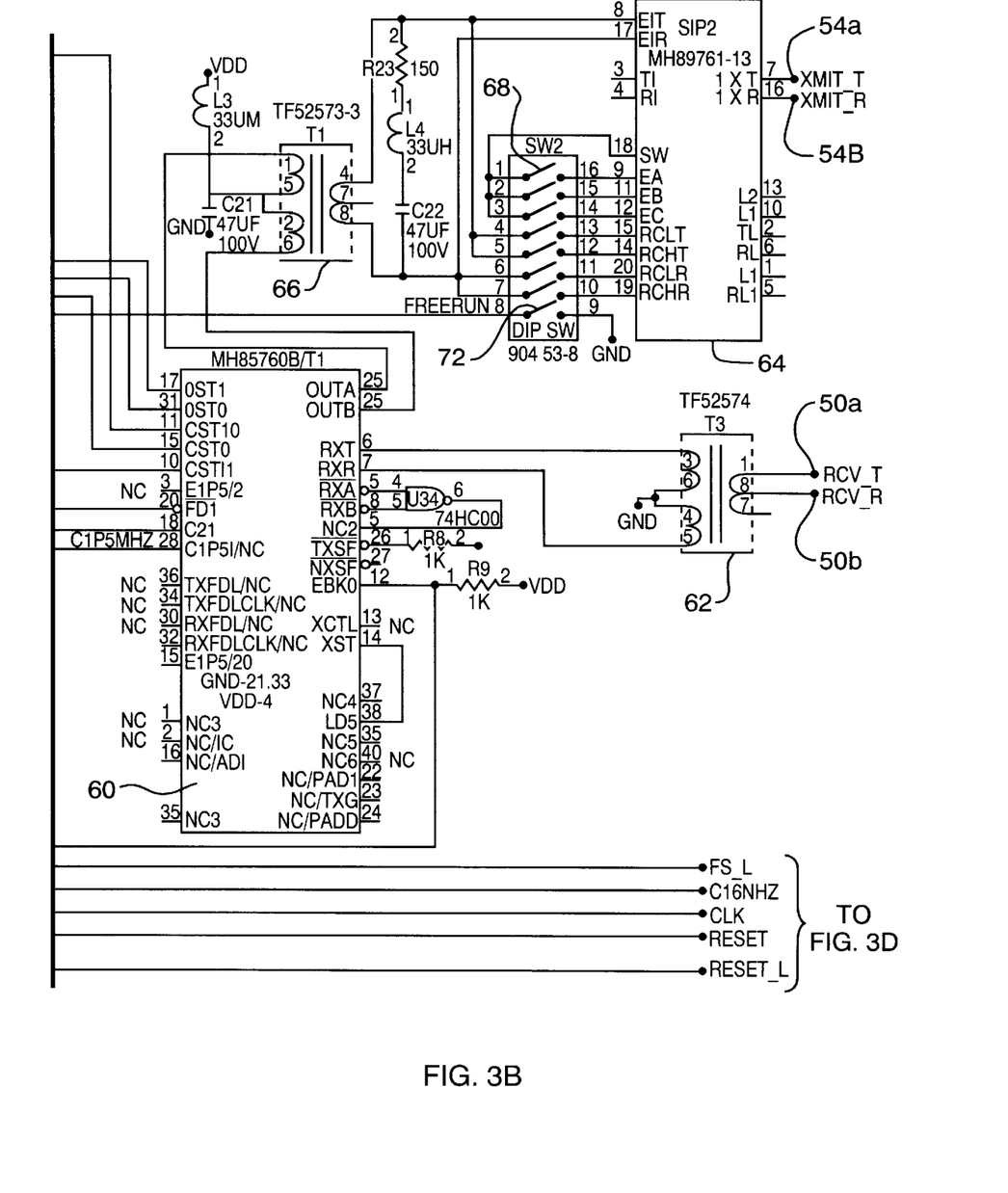
Figure 3C:
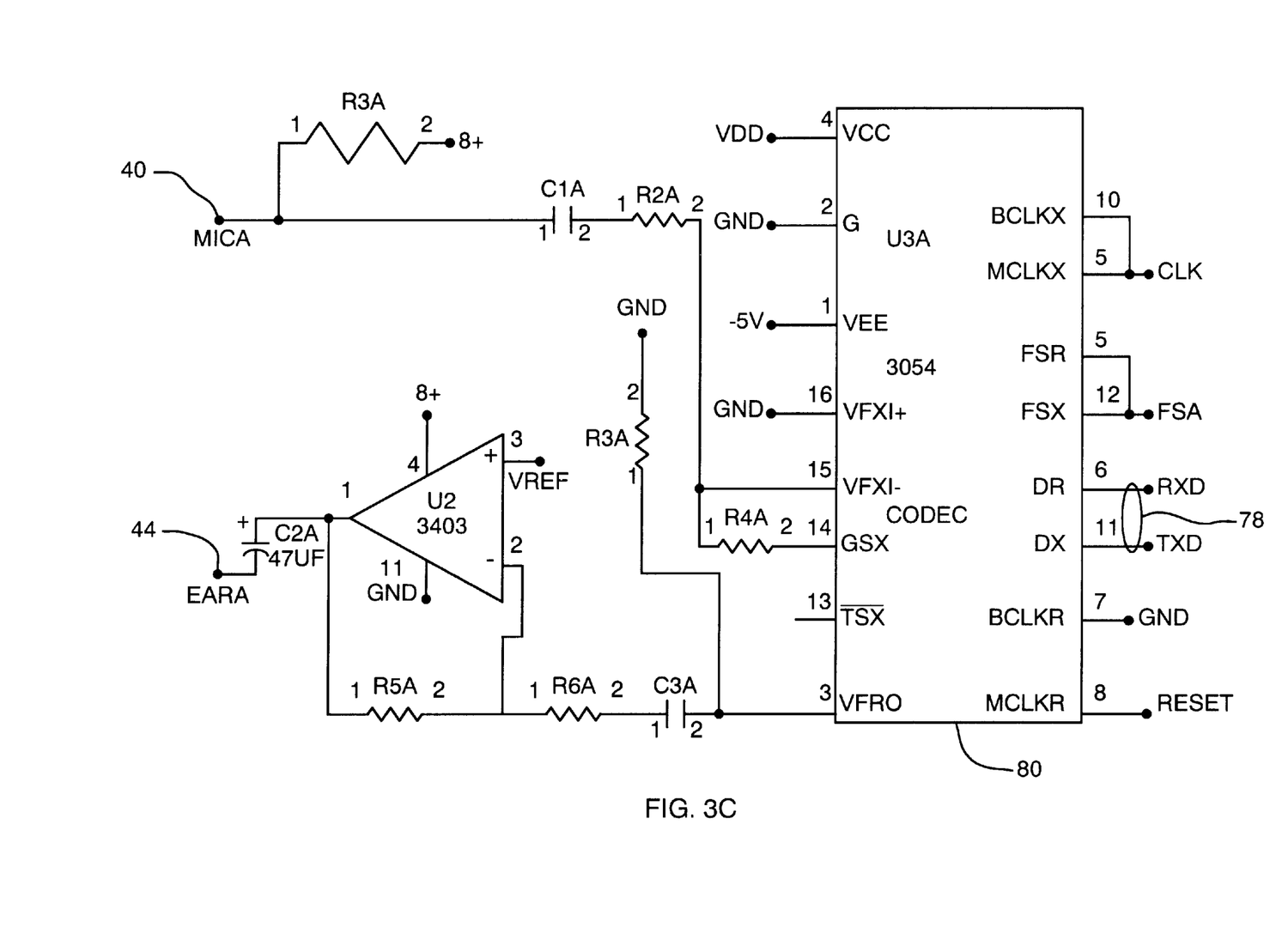
Figure 3D:
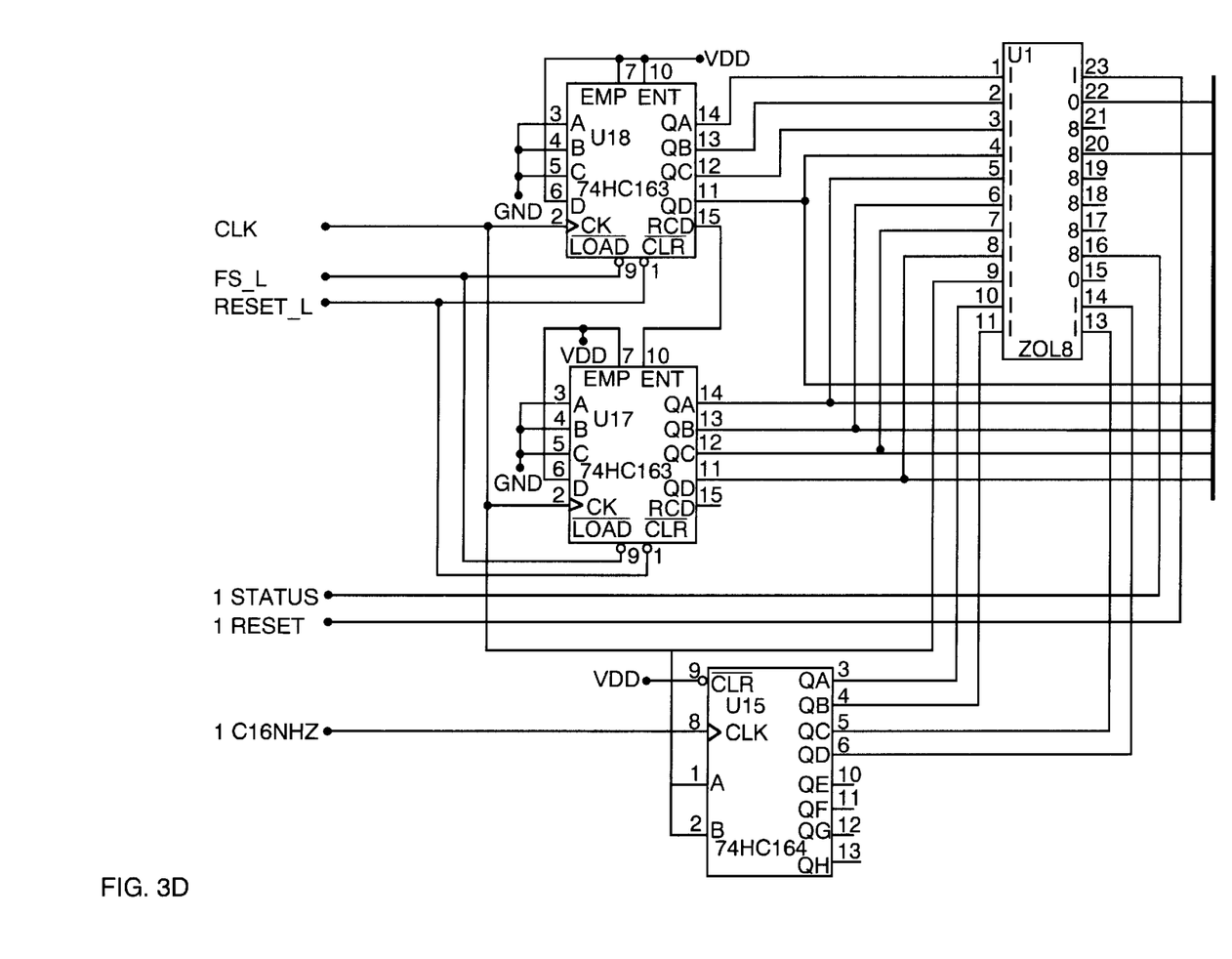
Figure 3E:
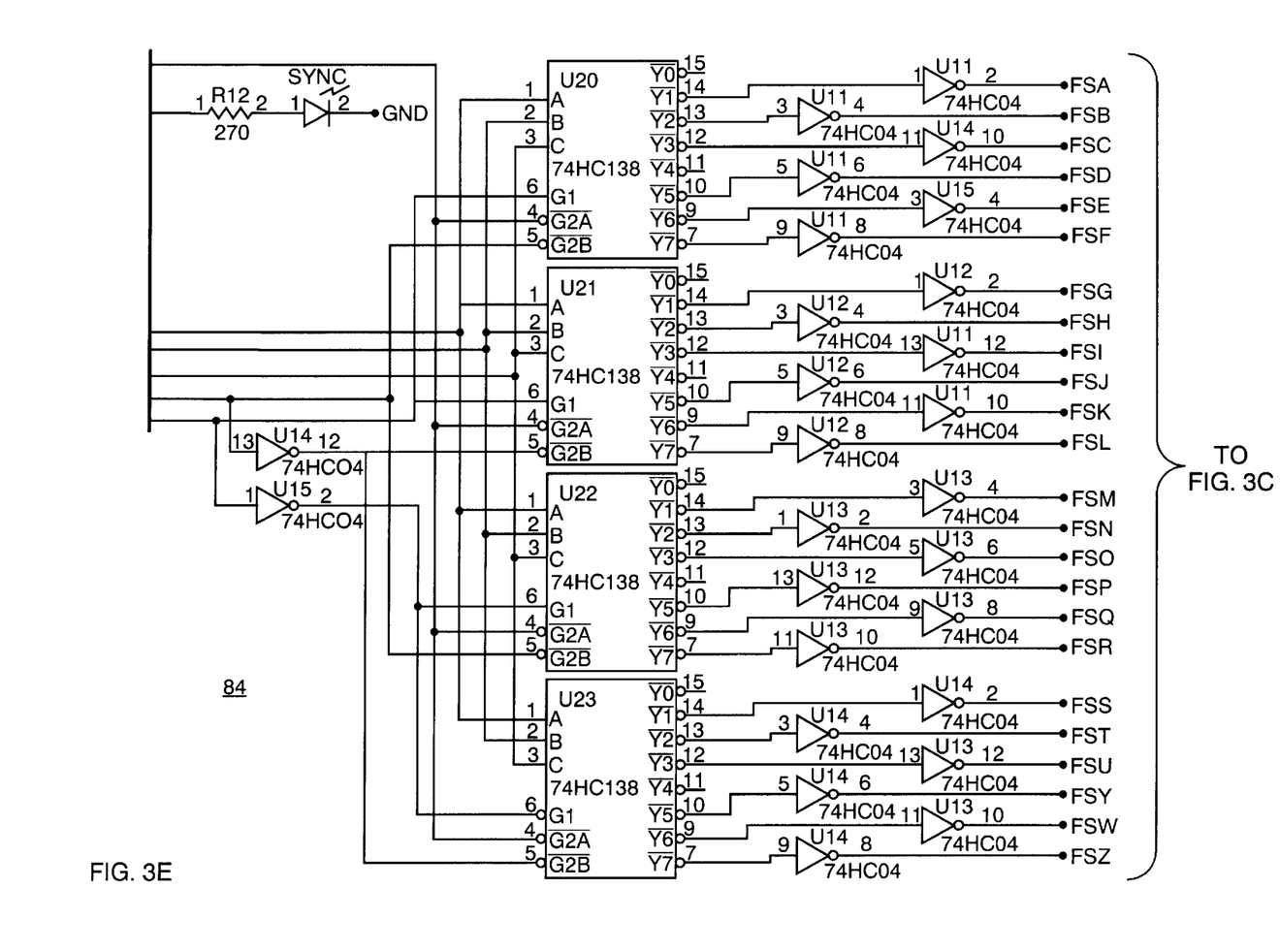

A circuit diagram according to one example of the audio communications device adapter 10 is shown in FIGS. 3A–3C. The T1 framer and interface 60, T1 transmit equalizer 64, transformers 62, 66, equalization switches 68, PLL 70, Hand system mode switch 72 are shown in FIG. 3A. One of the twenty-four codec circuits 80 is shown in FIG. 3B. The timing and control circuits 84 are shown in FIG. 3C. The present invention contemplates other circuit arrangements and implementations of the audio communications device adapter 10 of the present invention.

Accordingly, the audio communications device adapter of the present invention increases the number of audio communications devices, such as headsets, that can be connected to a digital data path, such as a T1 data path, in a telephony system. The audio communications device adapter is a portable device that is cost effective, easy to install, extends the distance between the DCS and the audio communication devices, and does not require any additional configuration or unnecessary equipment to assign a T1 channel to an audio communication device or headset.

Modifications and substitutions by one of ordinary skill in the art are considered to be within the scope of the present invention which is not to be limited except by the claims which follow.

What is claimed is:

1. An audio communications device adapter for connecting a plurality of audio communications devices to digital data paths in a telephony system, wherein each of said plurality of audio communications devices includes a microphone and an earphone, said audio communications device adapter comprising:

at least one analog audio signal connector, for connecting to a plurality of microphone analog audio signal paths that receive outgoing analog audio signals from respective ones of said microphones, and for connecting to a plurality of earphone analog audio signal paths that transmit incoming analog audio signals to respective ones of said earphones;

at least one digital data connector, for connecting to at least one transmitting digital data path to transmit an outgoing digital data stream containing outgoing digital encoded audio signal data, and for connecting to at least one receiving digital data path to receive an incoming digital data stream containing incoming digital encoded audio signal data;

a digital data formatter, coupled to said digital data connector, for extracting said incoming digital encoded audio signal data from said incoming digital data stream received over said receiving digital data path, and for formatting said outgoing digital encoded audio signal data into said outgoing digital data stream; and an audio signal converter, coupled to said analog audio signal connector and to said digital data formatter, for converting said outgoing analog audio signals into said outgoing digital encoded audio signal data to be formatted by said digital data formatter, and for converting said incoming digital encoded audio signal data into said incoming analog audio signals to be transmitted to said earphone analog audio signal paths.

2. The audio communications device adapter of claim 1 wherein said analog audio signal connector includes:

a plurality of microphone analog audio signal connections, for connecting to said plurality of microphone analog audio signal paths; and a plurality of earphone analog audio signal connections, for connecting to said plurality of earphone analog audio signal paths.

3. The audio communications device adapter of claim 1 wherein digital data connector includes:

at least one receiving digital data connection, for connecting to said receiving digital data path; and at least one transmitting digital data connection, for connecting to said transmitting digital data path.

4. The audio communications device adapter of claim 3 wherein said digital data formatter includes:

a digital data framer and interface, coupled to said audio signal converter, for extracting frames of said incoming digital encoded audio signal data from said incoming digital data stream, and for framing said outgoing digital encoded audio signal data into said outgoing digital data stream;

timing and control circuits, coupled to said audio signal converter and to said digital data framer and interface, for timing and controlling transmission of said digital encoded audio signal data between said digital data framer and interface and said audio signal converter; and a digital data transmit equalizer, coupled to said digital data framer and interface and to said transmitting digital data connection, for equalizing said outgoing digital data stream containing said outgoing digital encoded audio signal data.

5. The audio communications device adapter of claim 4 wherein said digital data formatter further includes at least one programmable memory, coupled to said digital data framer and interface, for programming said digital data framer and interface.

6. The audio communications device adapter of claim 5 wherein said at least one programmable memory includes first and second serial PROMs.

7. The audio communications device adapter of claim 4 wherein said digital data formatter further includes a plurality of line length equalizer switches, coupled to said digital data transmit equalizer, for equalizing said outgoing digital encoded audio signal data based upon a length of said transmitting digital data path.

8. The audio communications device adapter of claim 4 wherein said digital data formatter further includes an operation mode switch, coupled to said digital data framer and interface and to said audio signal converter, for switching between a normal operation mode and a free-run operation mode used for testing.

9. The audio communications device adapter of claim 2 wherein said audio signal converter includes a plurality of codec circuits, corresponding to each of said plurality of microphone analog audio signal connections and to each of said plurality of earphone analog audio signal connections, for encoding said outgoing analog audio signals into said outgoing digital encoded audio signal data, and for decoding said incoming digital encoded audio signal data into said incoming analog audio signals.

10. The audio communications device adapter of claim 9 wherein said audio signal converter further includes a plurality of amplifier circuits, coupled to respective ones of said plurality of codec circuits, for amplifying said incoming analog audio signals decoded by said codec circuits.

11. The audio communications device adapter of claim 1 wherein said digital data paths include a T1 data path, and wherein said digital data connector includes a T1 connector.

12. The audio communications device adapter of claim 1 wherein said digital data paths include an E1 data path, and wherein said digital data connector includes a E1 connector.

13. An audio communications device adapter for connecting a plurality of audio communications devices to a T1 data path in a telephony system, wherein each of said plurality of audio communications devices includes a microphone and an earphone, said audio communications device adapter comprising:

a plurality of microphone analog audio signal connections, for connecting to a plurality of microphone analog audio signal paths that receive outgoing analog audio signals from respective said microphones; and a plurality of earphone analog audio signal connections, for connecting to a plurality of earphone analog audio signal paths that transmit incoming analog signals to respective said earphones;

at least one receiving T1 connection, for connecting to a receiving T1 data path to receive at least one incoming T1 data stream over said receiving T1 data path; and at least one transmitting T1 connection, for connecting to a transmitting T1 data path to transmit at least one outgoing T1 data stream over said transmitting T1 data path;

a T1 framer and interface, coupled to said receiving T1 connection, for extracting frames of digital encoded audio signal data from said incoming T1 data stream, and for framing outgoing digital encoded audio signal data into said outgoing T1 data stream;

a plurality of codec circuits, coupled to said T1 framer and interface and between respective ones of said plurality of microphone analog audio signal connections and said plurality of earphone analog audio signal connections, for decoding said incoming digital encoded audio signal data extracted by said T1 framer and interface into said incoming analog audio signals to be transmitted to said earphone analog audio signal paths, and for encoding said outgoing analog audio signals received from said plurality of microphone analog audio signal paths into said outgoing digital encoded audio signal data to be transmitted to said T1 framer and interface; and a T1 transmit equalizer, coupled to said T1 framer and interface and to said transmitting T1 connection, for equalizing said outgoing T1 data stream formatted by said T1 framer and interface, and for transmitting said outgoing T1 data stream over said transmitting T1 data path.

14. The audio communications device adapter of claim 13 further including at least one programmable memory, coupled to said T1 framer and interface, for programming said T1 framer and interface.

15. The audio communications device adapter of claim 14 wherein said at least one programmable memory includes first and second serial PROMs.

16. The audio communications device adapter of claim 13 further including timing and control circuits, coupled to said T1 framer and interface and to said codec circuits, for timing and controlling transmission of said digital encoded audio signal data between said T1 framer and interface and said codec circuits.

17. The audio communications device adapter of claim 13 further an operation mode switch, coupled to said T1 framer and interface and to said codec circuits.

18. The audio communications device adapter of claim 17 wherein said operation mode switch switches between a normal operation mode and a free-run operation mode used for testing.

19. The audio communications device adapter of claim 13 further including a plurality of amplifier circuits between respective ones of said plurality of codec circuits and said plurality of earphone analog audio signal connections, for amplifying said incoming analog audio signals decoded by said codec circuits.

20. The audio communications device adapter of claim 19, wherein said T1 data path carries twenty-four channels, wherein said plurality of microphone analog audio signal connections, plurality of earphone analog audio signal connections, said plurality of codec circuits, and said plurality of amplifiers correspond to respective ones of said 24 channels.

21. The audio communications device adapter of claim 13 further including a PLL for system synchronization.

22. The audio communications device adapter of claim 13 further including a plurality of T1 line length equalizer switches coupled to said T1 transmit equalizer, for equalizing said outgoing digital encoded audio signals based upon a length of said T1 data transmit path.

23. An audio communications device adapter for connecting a plurality of audio communications devices to digital data paths in a telephony system, wherein each of said plurality of audio communications devices includes a microphone and an earphone, said audio communications device adapter comprising:

at least one analog audio signal connection means, for connecting to a plurality of microphone analog audio signal paths that receive outgoing analog audio signals from respective ones of said microphones, and for connecting to a plurality of earphone analog audio signal paths that transmit incoming analog audio signals to respective ones of said earphones;

at least one digital data connection means, for connecting to at least one transmitting digital data path to transmit an outgoing digital data stream containing outgoing digital encoded audio signal data, and for connecting to at least one receiving digital data path to receive an incoming digital data stream containing incoming digital encoded audio signal data;

digital data formatting means, coupled to said digital data connector, for extracting said incoming digital encoded audio signal data from said incoming digital data stream received over said receiving digital data path, and for formatting said outgoing digital encoded audio signal data into said outgoing digital data stream; and audio signal converting means, coupled to said analog audio signal connector and to said digital data formatter, for converting said outgoing analog audio signals into said outgoing digital encoded audio signal data to be formatted by said digital data formatter, and for converting said incoming digital encoded audio signal data into said incoming analog audio signals to be transmitted to said earphone analog audio signal paths.

24. An expanded telephony system comprising:

a digital communications server, for processing and routing digital encoded audio signals in said telephony system;

at least one digital data cable, connected to said digital communications server;

a plurality of audio communications devices, wherein each of said audio communications devices include a microphone and an earphone;

at least one analog audio cable, coupled to each of said plurality of audio communications devices;

at least one audio communications device adapter including:

at least one analog audio signal connector, connected to one of said at least one analog audio cable for receiving outgoing analog audio signals from respective ones of said microphones, and for transmitting incoming analog audio signals to respective ones of said earphones;

at least one digital data connector, connected to said digital data cable, for transmitting an outgoing digital data stream containing outgoing digital encoded audio signal data, and for receiving an incoming digital data stream containing incoming digital encoded audio signal data;

digital data formatting means, coupled to said digital data connector, for extracting said incoming digital encoded audio signal data from said incoming digital data stream, and for formatting said outgoing digital encoded audio signal data into said outgoing digital data stream; and audio signal converting means, coupled to said analog audio signal connector and to said digital data formatter, for converting said outgoing analog audio signals into said outgoing digital encoded audio signal data to be formatted by said digital data formatter, and for converting said incoming digital encoded audio signal data into said incoming analog audio signals to be transmitted to said earphones.

* * * * *